J. LA KAMP.
FRUIT JAR HOLDER.
APPLICATION FILED AUG. 9, 1910.
1,001,535.
Patented Aug. 22, 1911.
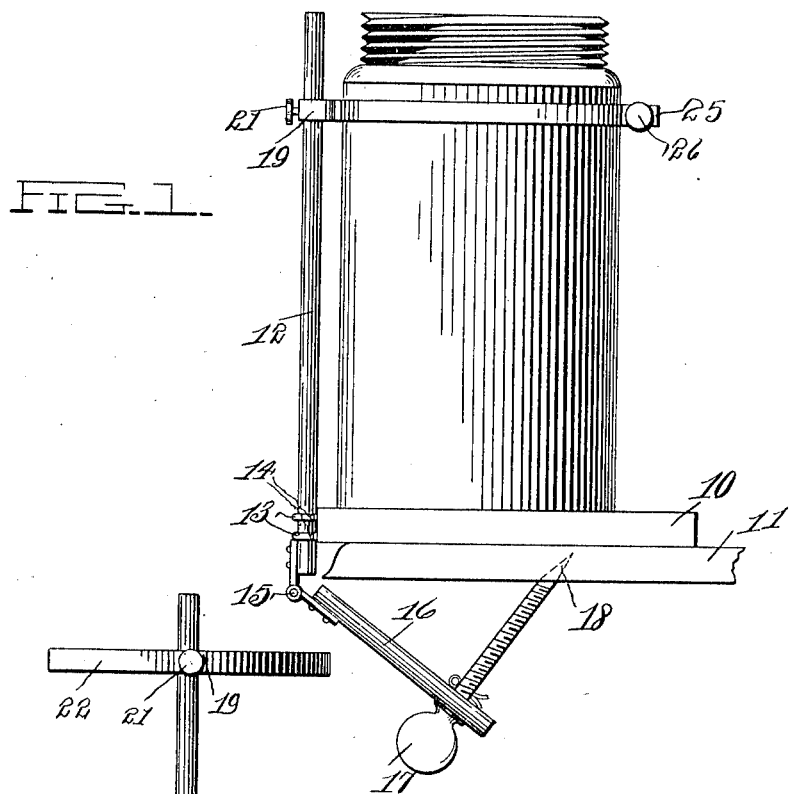
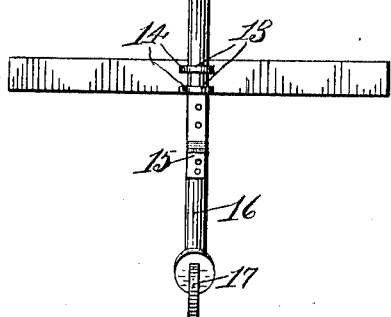
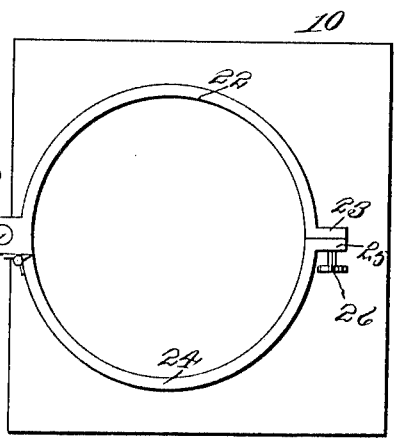
Witnesses
J. H. Taylor
Francis Boyle
Inventor
Jennie La Kamp.
Attorneys

UNITED STATES PATENT OFFICE.

JENNIE LA KAMP, OF BUFORD, COLORADO.

FRUIT-JAR HOLDER.

1,001,535.      Specification of Letters Patent.     Patented Aug. 22, 1911.

Application filed August 9, 1910. Serial No. 576,280.

*To all whom it may concern:*

Be it known that I, JENNIE LA KAMP, a citizen of the United States, residing at Buford, in the county of Rio Blanco, State of Colorado, have invented certain new and useful Improvements in Fruit-Jar Holders; and I do hereby declare the following to be a full, clear, and exact description of the invention, such as will enable others skilled in the art to which it appertains to make and use the same.

This invention relates to devices for securing hot fruit jars upon a table for filling.

The present invention aims to provide a simple and inexpensive fruit jar holder that will securely hold the fruit jar to the table and will be capable of being rocked beneath the table when not in use.

A further object is to provide a device of this character in which a fruit jar may be readily mounted or removed and will be supported above the table top so that fruit juices escaping over the sides of the jar will not stain the table.

In the accompanying drawing forming part of this specification: Figure 1 is a side elevation of the fruit jar holder showing the same applied to a table and securing a fruit jar. Fig. 2 is a plan view of the device. Fig. 3 is an end elevation of the device.

Referring now to the drawing, the numeral 10 designates a substantially rectangular base formed of wood, fiber or similar material and designed to rest upon a table top 11. The base is of sufficient size to support quart fruit jars and presents its top surface considerably above the table top so that fruit juices overflowing from the mouth of the jar will lodge thereupon and are prevented to a considerable extent from contact with the table top so that the latter is not stained during the filling of fruit jars.

Rising from the rear edge of the base is a rod 12, this rod projecting slightly below the base and being secured thereto by means of straps 13 which straddle the rod and have their extremities secured by screws or other means 14 to the edge of the base. Fixed to the lower portion of the rod is one leg of a hinge 15, the other leg of this hinge being fixed to a rod 16 that is arranged below and inclined obliquely to the bottom face of the table top. Threaded through a suitable opening in this rod 16 is a set screw 17, the point 18 of which is adapted to be advanced into the bottom face of the table top.

It will be observed that the base may be rocked rearwardly by virtue of the hinge connection between the rods 12 and 16 so as to be disposed underneath a table top when it is desired to have an unobstructed table top.

For retaining the fruit jars upon the base, a rectangular head 19 is provided centrally with a circular opening 20 which loosely fits the rod 12 and is provided on one of its sides with a set screw 21 which engages the rod and locks the head in any desired position thereupon. Projecting from the forward corner of the head is an arcuate jaw 22, the free end of which is equipped with a lip 23. Upon the opposite corner of the head is an arcuate jaw 24 that terminates in its forward end in a lip 25 which registers with the lip 23 when the jaws are closed, the lip 25 being provided with a set screw 26 which may be advanced into the lip 23 to lock the jaws in closed position. It is evident by backing out the set screw the fruit jar may be slid into the fixed jaw when the hinged jaw 24 may be closed and the set screw advanced to lock the jaws in this position. It will be noted that when the set screw 21 is advanced tightly against the upright rod 20 that the clamp formed by the jaws above described is prevented against swiveling movement upon the rod so that accidental displacement of the fruit jar is prevented.

What is claimed is:—

A container holder including a stand rod, container securing means adjustably mounted on said stand rod, a swinging element terminally secured to the lower end of said stand rod and swingable underneath a container support, and a support penetrating pin secured to the free end portion of said swinging element.

In testimony whereof, I affix my signature, in presence of two witnesses.

JENNIE LA KAMP.

Witnesses:
 JAMES A. BILLS,
 JAMES L. TAGERT.

---

Copies of this patent may be obtained for five cents each, by addressing the "Commissioner of Patents, Washington, D. C."